(12) United States Patent
Kim et al.

(10) Patent No.: US 6,210,097 B1
(45) Date of Patent: Apr. 3, 2001

(54) BURDEN LOADING ROBOT HAVING BALANCER FOR COMPENSATING FOR OFF-CENTER LOADING OF WEIGHT

(75) Inventors: Sung Kwun Kim, Seoul; Hak Kyung Sung, Seongnam, both of (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/362,736

(22) Filed: Jul. 29, 1999

(30) Foreign Application Priority Data

Jun. 25, 1999 (KR) .................................. 99-23464

(51) Int. Cl.[7] .............................. B25J 19/00; B25J 5/00; B25J 18/02
(52) U.S. Cl. ............................ 414/522; 414/719; 74/29; 74/490.01; 901/14; 901/19
(58) Field of Search ........................ 74/490.01, 490.03, 74/29; 414/719, 522; 901/48

(56) References Cited

U.S. PATENT DOCUMENTS

| 3,713,544 | * | 1/1973 | Wallace et al. ..................... 414/719 |
| 4,442,387 | * | 4/1984 | Lindbom .............................. 901/49 |
| 4,466,307 |   | 8/1984 | Kouno . |

FOREIGN PATENT DOCUMENTS

| 3618223 | * | 12/1986 | (DE) | ..................................... 901/48 |
| 3-208581 | * | 9/1991 | (JP) | ..................................... 901/48 |
| 686865 | * | 9/1979 | (SU) | ..................................... 901/48 |
| 795943 | * | 1/1981 | (SU) | ..................................... 901/48 |
| 1293017 | * | 2/1987 | (SU) | ..................................... 901/48 |

* cited by examiner

*Primary Examiner*—David A. Bucci
*Assistant Examiner*—William C Joyce
(74) *Attorney, Agent, or Firm*—Larson & Taylor PLC

(57) ABSTRACT

A burden loading robot includes a loading portion installed in a robot main body and a balancer for offsetting off-center loading of weight of the loading portion. The loading portion includes a loading plate which can be moved away from a fixing portion to a loading position outwards from the robot main body. When the loading plate is moved to the loading position, the balancer moves to the direction reverse to that of the loading plate at the same time. Thus, off-center loading of weight generated when a burden is loaded on the loading plate is offset by the balancer, to accordingly avoid the robot from falling down.

5 Claims, 4 Drawing Sheets

BURDEN LOADING ROBOT HAVING BALANCER FOR COMPENSATING FOR OFF-CENTER LOADING OF WEIGHT

BACKGROUND OF THE INVENTION

1. Field of the Invention

The present invention relates to a robot for loading burdens, and more particularly, to a burden loading robot having a balancer for compensating for off-center loading of weight of burdens so that the robot does not fall down when loading burdens of heavy weight.

2. Description of the Related Art

In industrial fields, various types of robots for loading burdens are used in order to efficiently carry burdens required for production of products. Generally, such a robot includes a robot main body for operation of the robot itself and a loading plate installed on the robot main body, on which the burdens are loaded. The loading plate is moved horizontally outwards from the robot main body and placed in a loading position in the course of loading, so that a worker can easily perform a work of loading burdens on the robot. The worker loads burdens on the loading plate at the state where the loading plate is placed at a loading position. When the loading of burdens is completed, the loading plate is moved back to the upper portion of the robot main body. Thereafter, the robot on which the burdens have been loaded moves to a desired position to remove the burdens. Otherwise, the robot main body moves the loading plate on which burdens have been loaded to a desired position. Then, the loading plate is moved back to the loading position as described above, so that the worker unloads the burdens easily.

In a conventional burden loading robot as described above, when a heavy-weight burden such as a liquid crystal display (LCD) panel carrier or a flat-panel display carrier is loaded on the loading plate, a big moment is applied to the robot due to the weight of the burden. Thus, when the weight is off-center on the extended loading plate, the robot may fall down. Particularly, in the case of a mobile robot for loading burdens as in an unmanned car which is not fixed to the ground, the robot may fall down where a big moment is applied thereto.

SUMMARY OF THE INVENTION

To solve the above problems, it is an object of the present invention to provide a burden loading robot for compensating for off-center loading of weight generated when burdens are loaded on an outwardly positioned loading plate, to thereby avoid the robot falling down and to enable the robot to perform a loading work stably even though a heavy-weight burden is loaded on the robot.

To accomplish the above object of the present invention, there is provided a burden loading robot comprising: a robot main body; a loading portion having a fixing portion which is fixed to the robot main body and a loading plate whose loading position is moved between loading positions spaced from the robot main body; a balancer installed to be accessed to and spaced from the robot main body; a driver for driving the balancer to gain access to and be spaced from the robot main body; and a controller for controlling the driver so that the balancer moves to a direction reverse to the movement direction of the loading plate when the loading plate moves to the loading position, in order to compensate for off-center loading of weight of the burdens loaded on the loading plate.

Here, the driver comprises a rack connected with the balancer; a pinion threadedly engaged with the rack; and a driving motor for driving the pinion in the forward and backward directions. It is preferable to further comprise a loading portion driving means for driving the loading plate to move between the fixing portion and the loading position. The controller controls the driver and the loading portion driving means to be interlocked with the loading portion to drive the balancer.

BRIEF DESCRIPTION OF THE DRAWINGS

The object and other advantages of the present invention will become more apparent by describing in detail the structures and operations of the present invention with reference to the accompanying drawings, in which.

DETAILED DESCRIPTION OF THE INVENTION

Preferred embodiments of the present invention will be described in detail with reference to the accompanying drawings.

Figure 1:
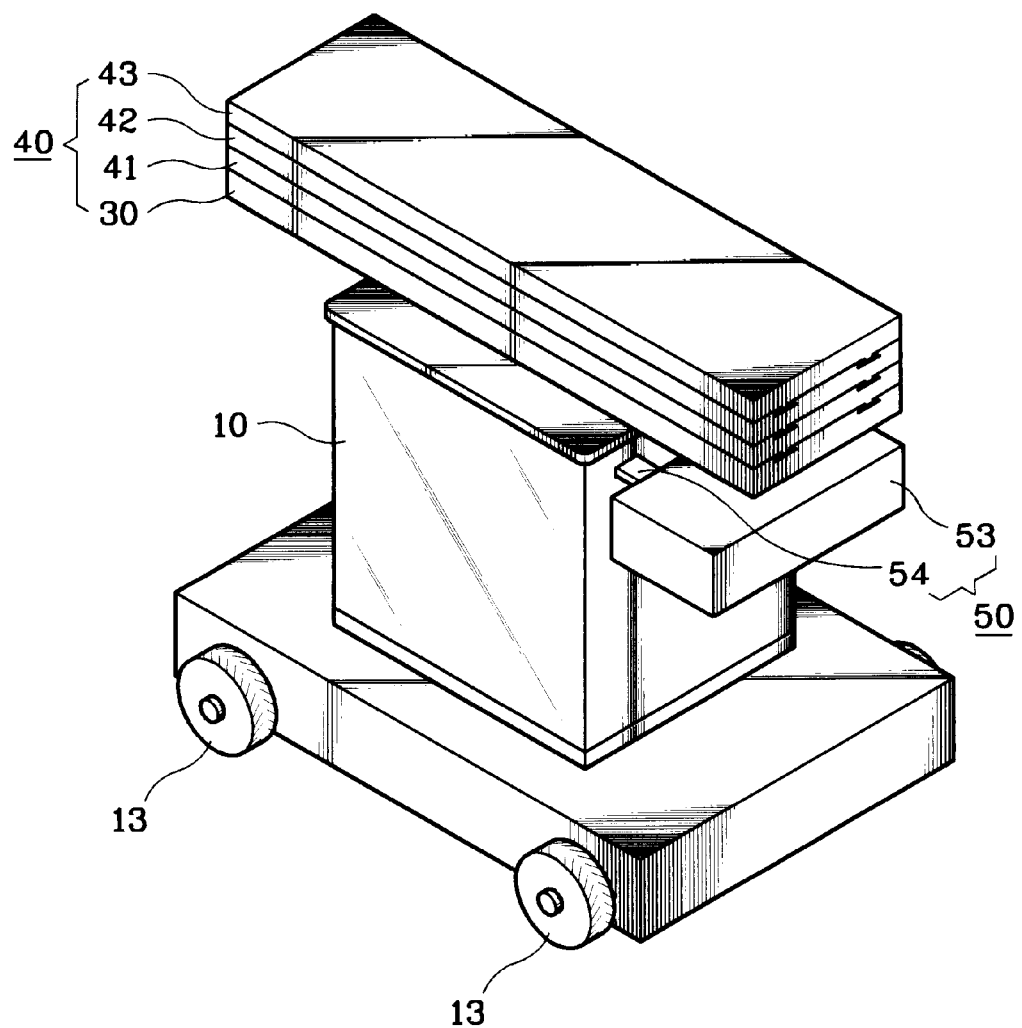
FIGS. 1 and 2 are perspective views showing a burden loading robot according to the present invention.
Figure 2:
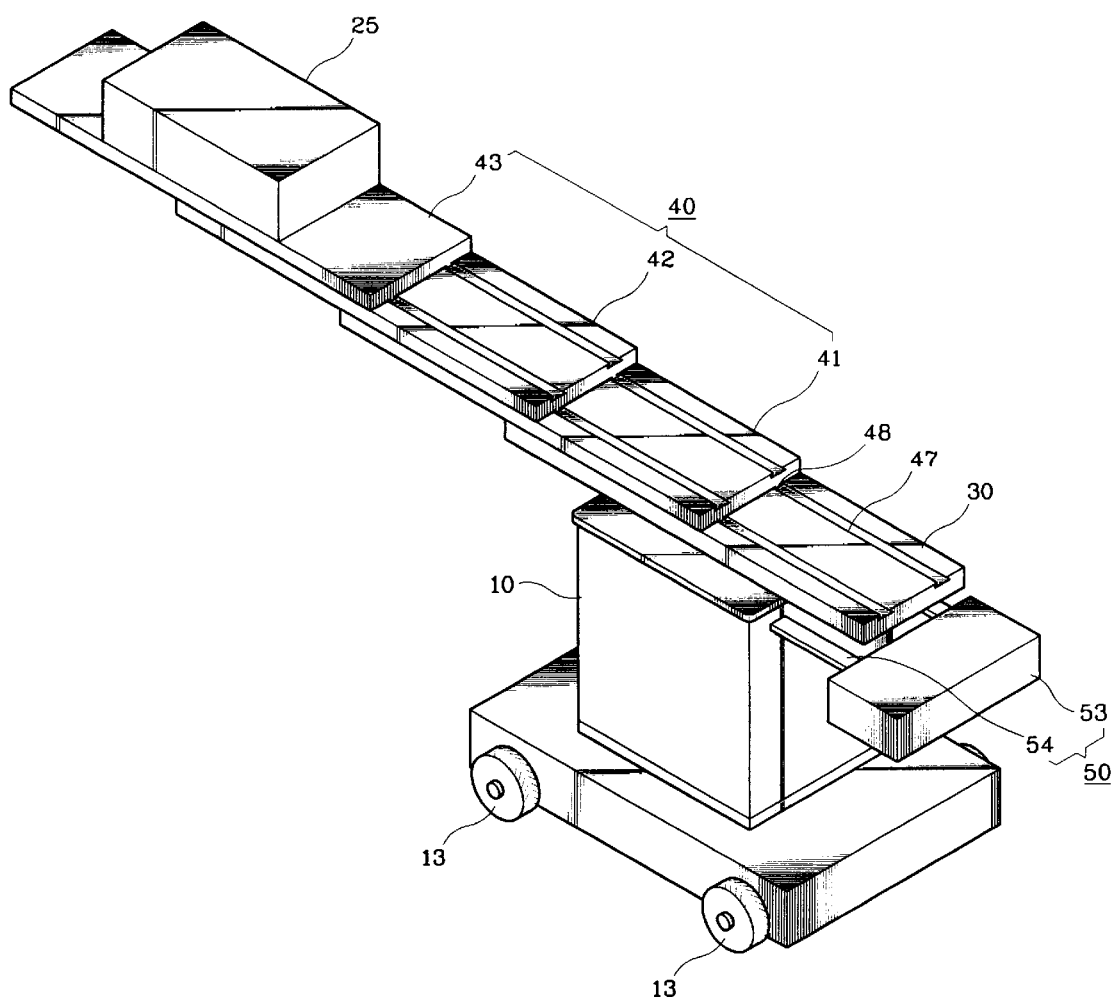

As shown in FIGS. 1 and 2, a burden loading robot according to the present invention includes a robot main body 10, a loading portion 40 and a balancer 50. FIGS. 1 and 2 show a state where the loading portion 40 is placed on the robot main body 10 and one where the former is moved horizontally outwards from the robot main body 10, respectively.

The robot main body 10 functions as a base for supporting the loading portion 40. A number of wheels 13 are provided on the lower side of the robot main body so as to be easily moved. Within the robot main body 10 there are provided a power transmission device necessary for movement of the robot and a controller for controlling operation of the robot. On the upper surface of the robot main body 10 is installed a fixing pate 30 for performing a function of the fixing portion for fixedly supporting the loading portion 40. The loading portion 40 is installed on the fixing plate 30.

The loading portion 40 includes first, second and third plates 41, 42 and 43 which are sequentially stacked over one after another. The plates 41, 42 and 43 are slidably connected with one after another, by means of guide grooves 47 and guide ribs 48 both of which are formed at the respective contact positions. Thus, the respective plates 41, 42 and 43 of the loading portion 40 move between the state where the plates 41, 42 and 43 are sequentially stacked over the robot main body 10 as shown in FIG. 1 and the state where the plates 41, 42 and 43 extend horizontally outwards from the robot main body 10 so that the third plate 43 moves to a predetermined position (which is called a loading position) as shown in FIG. 2.

The third plate 43 is a loading plate on which a burden 25 is loaded. When a worker loads burdens 25 on the loading plate 43 or unloads the former from the latter, he or she manipulates the loading portion 40 so that the loading plate 43 is withdrawn to a loading position as shown in FIG. 2, and a loading work is facilitated as necessary.

The balancer 50 includes a pair of rods 54 which are movably supported horizontally outwards from the robot main body 10 and a balancing (counter) weight 53 which is installed in the outer ends of the rods 54. The balancing (counter) weight 53 is made of a material of heavy weight so as to accomplish a target purpose. The balancer 50 can move to the reverse direction with respect to the direction of the loading portion 40 at the same line as the movement line of the loading portion 40. The movement of the balancer 50 is controlled under the control of a driving mechanism installed in the inside of the robot main body 10. The balancer 50 compensates for off-center loading of weight due to the burdens loaded on the loading portion 40 which will be described later.

Figure 3:
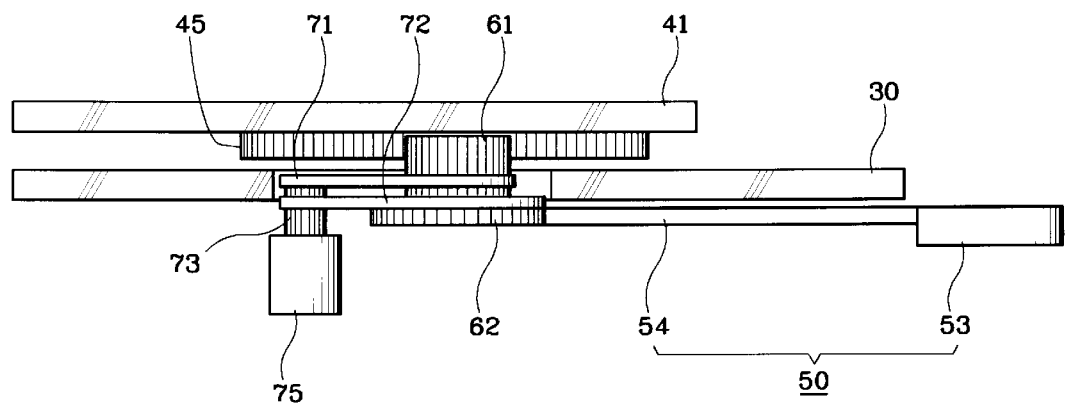
FIG. 3 is a partly enlarged elevational view of the burden loading robot shown in FIGS. 1 and 2.
Figure 4:
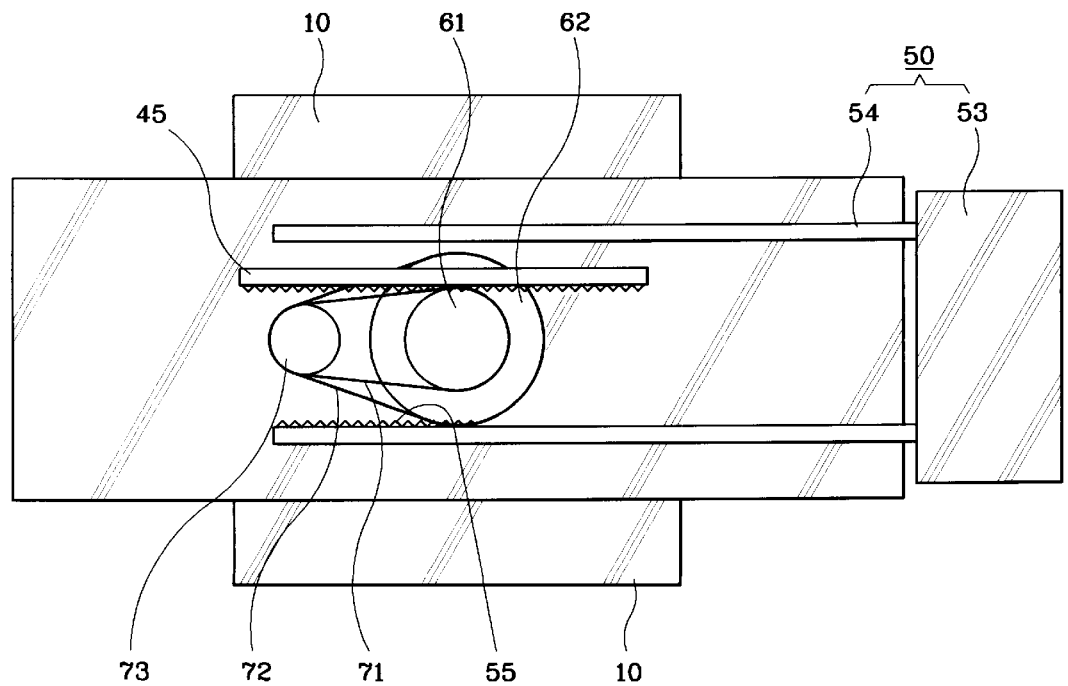
FIG. 4 is a top sectional view of FIG. 3.

FIGS. 3 and 4 show a driving mechanism for driving the balancer 50 and the loading portion 40. The driving mechanism includes a pair of racks 45 and 55, a pair of pinions 61 and 62, a pair of belts 71 and 72 and a driving motor 75. The driving mechanism is controlled by a separate controller (not shown).

A first rack 45 is fixed to a first plate 41 of the loading portion 40, and a second rack 55 is connected with a rod 54 of the balancer 50. The first rack 45 and the second rack 55 are threadedly engaged with a first pinion 61 and a second pinion 62, respectively. The first pinion 61 and the second pinion 62 are coaxially disposed. The first pinion 61 and the second pinion 62 are connected with a pulley 73 of the driving motor 75 by a first belt 71 and a second belt 72, respectively. A motor which can be driven in the forward and backward directions is used as the driving motor 75.

If a user manipulates a manipulator (not shown) in order to load a burden, a controller controls the driving motor 75 according to the user manipulation signal. When the driving motor 75 operates, both the first and second pinions 61 and 62 are rotated, in which case the first and second racks 45 and 55 are moved, respectively. Thus, the first plate 41 is moved to the left and the rod 54 and the balancing plumber 53 are moved to the right reverse to the first plate.

Although not shown in the drawings, the respective plates 41, 42 and 43 are connected with a separate mechanical mechanism so as to move in a telescopic structure. Thus, if the first plate 41 moves to the left, the second and third plates 42 and 43 relatively move to the left with respect to the plate contacting the bottom surface thereof, respectively. Thus, the second and third plates are extended sequentially as shown in FIG. 2. As a result, the third plate 43 is positioned at a loading position. In this state, when the user loads the burden 25 on the third plate 43, even though a burden of a relatively heavy weight is loaded on the third plate 43, the weight of the burden is offset by the balancing (counter) weight plumber 53 which is moved to the right. As a result, the robot does not fall down. Thus, a work for loading a burden of heavy weight can be stably performed. When the loading work has been completed, the driving motor 75 is driven in the reverse direction and then the loading plate 43 on which the burden has been loaded and the balancing (counter weight) 53 are restored to the original state.

Figure 5:
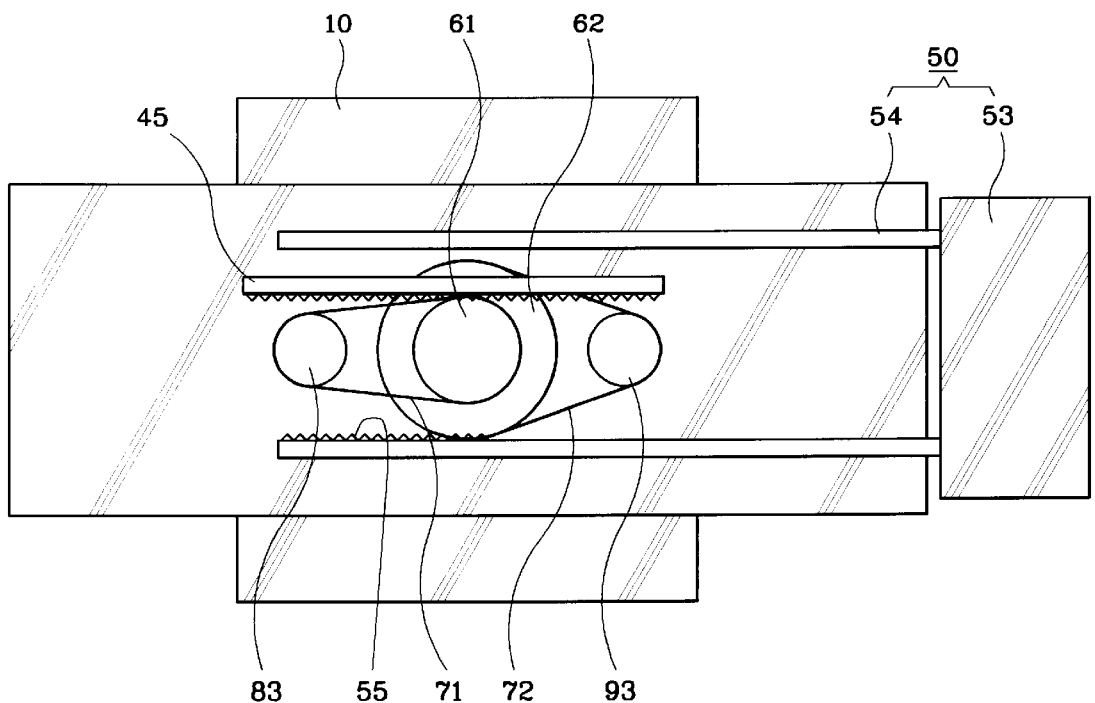
FIG. 5 is a top sectional view of a burden loading robot according to another embodiment of the present invention.
Figure 6:
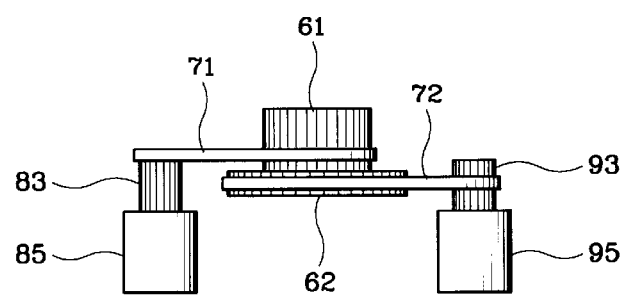
FIG. 6 is a side elevational view showing a power transmission portion of FIG. 5

FIGS. 5 and 6 show a different embodiment of the present invention. The same reference numerals as those in the previous embodiment are assigned with respect to the same components as those in the previous embodiment.

While the loading portion 40 and the balancer 50 have been driven by a single driving motor 75 in the previous embodiment, they are individually driven by two motors 85 and 95, respectively in this embodiment. That is, the first pinion 61 is connected with the pulley 83 of the second driving motor 85 by the first belt 71. The second pinion 62 is connected with the pulley 93 of the second driving motor 95 by the second belt 72. Thus, when the first driving motor 85 operates, the loading portion 40 is driven, and if the second driving motor 95 operates, the balancer 50 operates. Here, the loading portion 40 and the balancer 50 can be controlled so that extension degrees thereof differ from each other as desired. Also, the controller controls the first and second driving motors 83 and 93 at the same time according to the user's manipulation, so that the balancer 50 can extend in correspondence to an extension degree of the loading portion 40.

Also, in the embodiments of the present invention, the driving motor 75 (in the first embodiment) or the first driving motor 85 (in the second embodiment) is used when the loading portion 40 is moved to the loading position or restored from the loading position. However, the loading portion 40 can be manually moved without using the driving motor 75 or 85.

As described above, since the present invention can compensate for off-center loading of weight of a burden by a balancing (counter) weight when a burden of heavy weight is loaded on a loading plate, a loading robot would not fall down. Thus, a loading work can be stably performed.

What is claimed is:

1. A burden loading robot comprising:
   a robot main body including wheels by which said robot body is movable;
   a loading portion having a fixed member fixed to the robot main body and a loading plate movably attached to the fixed member for movement between an outer-most loading position spaced horizontally distal from one side of the robot main body and a carrying position located proximal to the robot main body, said loading plate having a flat upper surface upon which a burden is placed so as to be moved by movement of said robot main body;
   a balancer movably mounted to the main robot body so as to be movable between a proximal position adjacent to the main robot body and an outer-most distal position spaced horizontally distal from the robot main body on an opposite side of the main robot body from the one side;
   a balancer driver means for driving the balancer between the proximal position and the outer-most distal position at a first rate;
   a loading portion driver means for driving the loading plate between the carrying position and the loading position at a second rate greater than the first rate; and
   a controller for controlling the balancer driver means and the loading portion driver means so that the balancer moves towards the outer-most distal position in a direction reverse to the movement direction of the loading plate when the loading plate moves towards the outer-most loading position, in order for the balancer to compensate for an off-center loading of weight of the burdens loaded onto the loading plate after the loading plate is moved from the carrying position.

2. The burden loading robot according to claim 1, wherein said balancer driver means comprises:
   a first rack connected with the balancer; and
   a first pinion threadedly engaged with the first rack and having a first diameter;
   wherein said loading portion includes at least one intermediate plate to which the loading plate is movably fixed and which in turn is movably fixed to the robot main body such that horizontal movement of the loading plate also results in a complementary horizontal movement of the at least one intermediate plate;

wherein said loading portion driver means comprises:
  a second rack connected with the at least one intermediate plate;
  a second pinion threadedly engaged with the second rack and having a second diameter smaller that the first diameter; and wherein said balancer driver means and said loading portion driver means together include a driving motor for simultaneously driving, the first and second pinions in forward and backward directions.

3. The burden loading robot according to claim 1, wherein said controller controls the balancer driver means and the loading portion driving means to be interlocked so that the loading portion moves simultaneously with, but at a different rate to, the balancer.

4. The burden loading robot according to claim 1, wherein said balancer driver means comprises:

a first rack connected with the balancer,
  a first pinion threadedly engaged with the first rack and having a first diameter, and
  a first driving motor which drives the first pinion in forward and reverse directions; and wherein said loading portion driver means comprises:
  a second rack connected with the loading plate,
  a second pinion threadedly engaged with the second rack and having a second diameter smaller that the first diameter, and
  a second driving motor which drives the second pinions in forward and backward directions; and wherein said controller controls actuations of the first and second driving motors.

5. The burden loading robot according to claim 4, wherein said controller controls the first driving motor and the second driving motor so that the loading portion moves simultaneously with, but at a different rate to, the balancer.

* * * * *